US006765573B2

(12) United States Patent
Kouadio (10) Patent No.: US 6,765,573 B2
(45) Date of Patent: Jul. 20, 2004

(54) SURFACE SHADING USING STORED TEXTURE MAP BASED ON BIDIRECTIONAL REFLECTANCE DISTRIBUTION FUNCTION

(75) Inventor: Cyriaque Kouadio, Honolulu, HI (US)

(73) Assignee: Square Enix Co., Ltd., Tokyo (JP)

(*) Notice: Subject to any disclaimer, the term of this patent is extended or adjusted under 35 U.S.C. 154(b) by 392 days.

(21) Appl. No.: 09/899,802

(22) Filed: Jul. 6, 2001

(65) Prior Publication Data

US 2002/0080136 A1 Jun. 27, 2002

Related U.S. Application Data

(60) Provisional application No. 60/244,040, filed on Oct. 26, 2000.

(51) Int. Cl.⁷ .......................... G06T 15/50; G06T 15/60
(52) U.S. Cl. ...................................... 345/426; 345/582
(58) Field of Search ............................... 345/426, 428, 345/581, 582

(56) References Cited

U.S. PATENT DOCUMENTS

| | | | | |
|---|---|---|---|---|
| 4,991,971 A | * | 2/1991 | Geary et al. ................. | 356/446 |
| 6,333,740 B1 | * | 12/2001 | Kojima ....................... | 345/419 |
| 6,356,264 B1 | * | 3/2002 | Yasui et al. ................. | 345/426 |
| 6,552,726 B2 | * | 4/2003 | Hurley et al. ............... | 345/426 |

* cited by examiner

Primary Examiner—Mark Zimmerman
Assistant Examiner—Scott A Wallace
(74) Attorney, Agent, or Firm—Leighton K. Chong; Ostrager Chong & Flaherty (HI)

(57) ABSTRACT

An improved surface shading method computes and stores light reflectance values as a texture map for a given light direction and view direction to an object in a scene during development of a computer graphics (CG) program, and uses the stored texture map later for shading during real-time rendering. A selected bidirectional reflectance distribution function (BRDF) is applied using a standard model for distribution of normal direction vectors for a given type of surface, and BRDF values are computed as a global texture map for the object's surface in the scene. The BRDF values are stored as a look-up table indexed to the sampled range of normal direction vectors. During real-time rendering, surface shading can be readily processed by using the normal direction vector for any given point to look up the stored BRDF value. Shading with BRDF light reflectance values can be combined in one or more passes with shading of other surface texture characteristics, e.g., a facial skin surface textured with hair and facial features. In this manner, the rich tones of a physical light reflectance model can be obtained even for highly textured surfaces during real-time rendering. Besides standard types of light reflectance models (Torrance-Sparrow, Phong, Strauss, etc.), modified types of BRDF models (e.g., Schlick) may also be used to derive a BRDF texture map.

6 Claims, 5 Drawing Sheets

Figure 1: BRDF parameter definition

Figure 2: Distribution of normal directions in upper hemisphere

Figure 3: BRDF texture mapping

Figure 4: BRDF texture (Torrance-Sparrow) for different angles.

Figure 7: BRDF texture (Schlick) for different angles

Figure 5: BRDF texture mapped on a face model

Figure 6: BRDF texture mapped on a textured face model

Figure 8: BRDF texture mapped on a face model

Figure 9: BRDF texture mapped on a textured face model

FIG. 10

SURFACE SHADING USING STORED TEXTURE MAP BASED ON BIDIRECTIONAL REFLECTANCE DISTRIBUTION FUNCTION

This patent application claims the priority of U.S. Provisional Application No. 60/244,040 filed on Oct. 26, 2000, entitled "Microfacet Based Texture Map Using Bidirectional Reflectance Distribution Function", by the same inventor.

FIELD OF THE INVENTION

This invention relates to the field of computer graphics and, in particular, to an improved method for CG surface shading using a stored texture map for faster processing.

BACKGROUND OF THE INVENTION

Computer graphics (CG) systems create display images frame-by-frame from digital data representing mathematically-described objects in a scene. CG systems have been noteworthy recently in creating computer-generated special effects, animated films, interactive 3D video games, and other interactive or 3D effects in digital media. They are widely used for entertainment and advertising, computer aided design, flight simulation and training, and many other applications.

In advanced CG applications, a CG development platform is used to create an overall CG media program and accompanying database of scenes and objects, such as the MAYA™ development platform offered by Alias Wavefront, Inc., of Toronto, Ontario, Canada, which is a subsidiary of Silicon Graphics, Inc. The MAYA™ development platform is a 3D modeling, animation, and rendering software package that has advanced interface, workflow, flexibility, and depth features. MAYA includes many tools used for modeling and animation, including setting keyframes and constraints, inverse kinematics, attaching surfaces to skeletons, character modeling, nurbs modeling, character expressions, particle and dynamics suites for rigid and soft bodies, texturing, and tools for rendering including node-based shaders, anti-aliasing, motion blur, and selective raytracing/raycasting. At the heart of MAYA is MEL, its scripting language. Every action, every part of the interface, and every tool is invoked and described by MEL. It is, therefore, possible to create new tools, combinations of tools, completely modify the interface, and tie MAYA in with other software programs using MEL. Further information about the MAYA™ development platform can be obtained from "MAYA Software Rendering: A Technical Overview", by Andrew Pierce and Kelvin Sung, published by Alias/Wavefront, 1998, 2000.

The developed CG media program and data files, referred to as "SHOT" data files, can then be rendered into a visual display of the CG media program. The rendering process operates on a "World Task" which includes many different rendering tasks. The many rendering tasks include many independent operations which lend themselves to efficiencies obtained by parallel processing using multiple CPUs. One renderer capable of doing this is the RENDERMAN™ renderer developed by Pixar Animation Studios of Emeryville, Calif.

However, even with advanced CG systems, the computational intensity of rendering and the large data size of visually rich CG scenes can impose a high computational burden that requires that compromises be made in terms of image quality. For example, the light/color shading of surfaces of objects in an image scene typically requires computing the surface texture for each point on an object's surface from stored surface characteristic data, then computing the light reflectance characteristic of each such point according to a selected light reflectance model, then computing the reflected light values (typically, its specular and diffuse components) from each such point by applying a light vector from each illumination source (emitted, ambient, diffuse, and specular light) in the scene. Among the different light reflectance models that may be used, the ones based upon the physics of light interaction with surface material characteristics, for example, the bidirectional reflectance distribution function (BDRF), are the most accurate in terms of rendering quality, but among the most expensive (intensive) to compute. As a result, surface shading using a physical light reflectance model such as BRDF has been precluded from use in real-time rendering engines.

Accordingly, it is a principal object of the present invention to provide an improved method for CG surface shading that would allow the use of a physical light reflectance model in real-time CG rendering. It is a particular object of the invention to utilize the bidirectional reflectance distribution function as a physical light reflectance model in real-time CG rendering.

SUMMARY OF THE INVENTION

In accordance with the present invention, an improved method for computer graphics (CG) surface shading comprises:

(a) determining surface characteristics and geometry parameters of a surface of an object in a scene during development of a CG program;

(b) determining for a frame of the scene an incoming light direction illuminating the surface of the object and an outgoing direction of viewing the object in the scene;

(c) applying a selected bidirectional reflectance distribution function (BRDF) model to compute light reflectance values for a sampled range of normal direction vectors of light reflectance from the surface of the object in the frame of the scene based upon the incoming and outgoing light directions and the surface characteristics and geometry parameters of the surface of the object;

(d) storing the sampled BRDF values as a texture map of light reflectance for surface shading of the object in the frame of the scene; and (e) performing surface shading of the object during real-time rendering by applying the sampled BRDF values in correspondence to normal direction vectors for points on the surface of the object in the frame of the scene.

The invention technique employs a selected BRDF model during development of a CG program to compute light reflectance values for a sampled range of normal direction vectors as a texture map to be used later during rendering. The BRDF model is applied with a standard model for distribution of normal direction vectors for a given type of surface, and the BRDF values are computed and stored as a look-up table indexed to the sampled range of normal direction vectors. During real-time rendering, surface shading can be readily processed by using the normal direction vector for any given point to look up the stored BRDF value. Shading with BRDF light reflectance values can be combined in one or more passes with shading of other surface texture characteristics, e.g., a facial skin surface textured with hair and facial features. In this manner, the rich tones of a physical light reflectance model can be obtained even for highly textured surfaces during real-time rendering. Besides standard types of light reflectance models (Torrance-Sparrow, Phong, Strauss, etc.), modified types of BRDF models (e.g., Schlick) may also be used to derive a BRDF texture map.

Other objects, features, and advantages of the present invention will be described in further detail below, with reference to the following drawings:

DETAILED DESCRIPTION OF INVENTION

A preferred implementation of the improved method of surface shading in accordance with the present invention is described in detail below using the example of a physical light reflectance model for interaction of light with a textured surface. However, it is to be understood that the general principles of the invention have broad applicability to rendering involving other types of surface texture characteristics and physical light reflectance models as well.

Surface shading of objects in an image scene is conventionally accomplished during rendering by computing the surface texture characteristics for each point on an object's surface from stored surface characteristic and geometry parameters and then computing the light reflectance value from that point. The reflected light for each point is computed based upon the various incoming sources of illumination (emitted, ambient, diffuse, and specular light) on the object. For further information about light illumination and reflection in conventional surface shading, reference is made to "Lighting", Chapter 6, from "Open GL programming Guide", Silicon Graphics, Inc., published by Addison-Wesley Publishing Company.

In conventional CG techniques, the surface of an object can be envisioned as a set of microfacet mirrors that are wrapped over the contour of an object (spherical, ovoid, flat, etc.). The microfacets can have varying orientations (represented by their normal direction vectors) at the minute local level and can result in complex light reflection paths reflecting from a number of microfacets in a complex scattering of light in the vicinity of an observed point. This complex light scattering provides a surface with its characteristic light reflectance "texture". Modeling the light reflectance texture of a surface can provide a viewer with a more richly rendered image of the surface, as contrasted, for example, to a simple model of a shiny surface with a spot reflection. However, computation of the complex light scattering from microfacets for each point on the surface of the object would be an enormously time-consuming, if not impossible, task for real-time rendering.

Computing light reflectance can be simplified somewhat using the notion of Bidirectional Reflectance Distribution Function (BRDF) and BRDF lighting techniques. In the BRDF concept, the complex light interactions from microfacets at the minute local level are ignored, and instead the light reflectance for a point on a surface are modeled on the basis of incoming light direction to a point, outgoing light direction (eye view direction) from the point, and the wavelength of light. BRDF can thus be written as a function of light direction vectors and parameters in terms of spherical coordinate geometry rather than cartesian coordinates. The light reflectance values returned for the BRDF function can be derived by evaluating mathematical functions approximating analytical light reflectance models or by sampling empirical measurements of real-world surfaces.

Conventional analytical models have been developed that generate a wide range of visually interesting light reflectance effects, including the Cook-Torrance, Torrance-Sparrow, Phong, Ward, Strauss, and other models. In general, different models are useful in modeling the light reflectance characteristics of different types of materials. For example, the Ward model is good at modeling the reflectance properties of anisotropic surfaces, such as brushed metal. The Cook-Torrance model is effective at simulating many types of reflective metal, such as copper and gold, and plastics with varying degrees of roughness. In contrast to analytical models, BRDF values can also be acquired through physical measurements with measuring devices like a gonioreflectometer. Acquired BRDF values for many different types of surfaces are available from libraries of several academic institutions and commercial companies. For further details, reference is made to the article entitled "Introduction to BRDF-Based Lighting", by Chris Wynn, published by Nvidia Corporation, 2000.

While BRDF models have been proposed as a useful way to derive light reflectance values instead of computing complex light scattering from different types of surfaces, they are not widely used in real-time CG rendering because they are still too computationally intensive for conventional computer graphics hardware in widespread use.

In the present invention, a selected BRDF function is used to generate a light reflectance texture map during development of a CG program and stored for later use during real-time rendering. The texture map is stored as a look-up table of light reflectance values indexed to normal direction vectors over a sampled range of spherical coordinates. During rendering, the object's surface is shaded by retrieving the stored light reflectance value for the corresponding normal direction vector ascribed to the point on the surface. In this manner, the richness of the BRDF modeling of light reflectance from a surface can be incorporated in surface shading, without the computational cost of using the BRDF model during real-time rendering. This approach is well suited to the demands of real-time rendering using conventional hardware and standard multipass rendering techniques. It is particularly advantageous for shading textured surfaces, such as the human face. An example of the application of a BRDF texture map to surface shading in accordance with the invention is described below. A detailed explanation of the mathematics of BRDF texture map is provided in the accompanying Table I.

Figure 1:
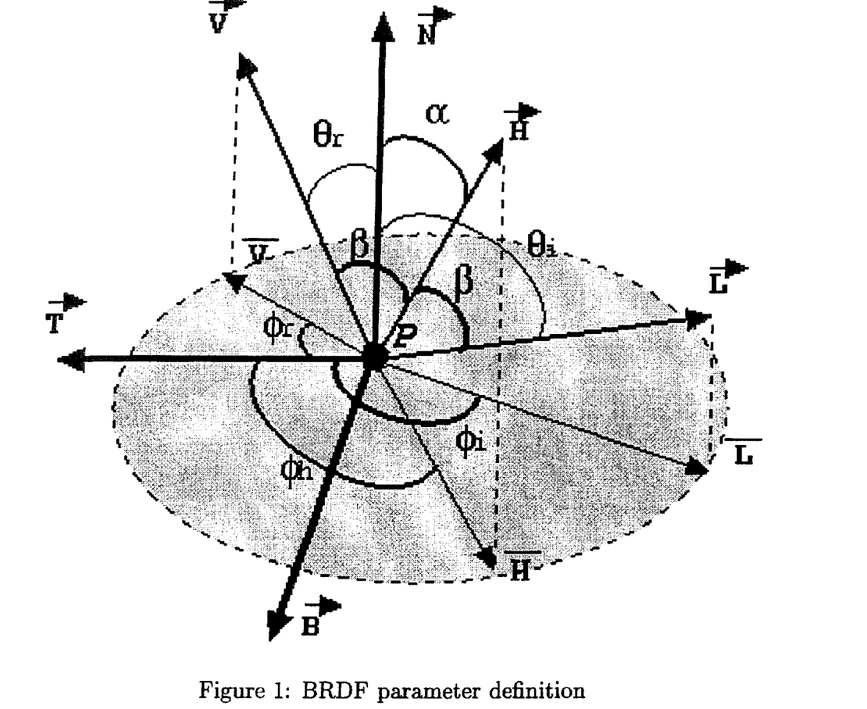
FIG. 1 is an illustration of BRDF parameter definition at a given surface point.

FIG. 1 illustrates the BRDF model that is used for creating a light reflectance texture map during development of a CG program. The BRDF model can be thought of in terms of an incoming light direction represented by the negative of light vector L, an outgoing light direction represented by the eye view vector V, a normal direction vector N representing the orientation of the surface at the point P, and a surface tangent vector T and surface normal vector B defining the surface around the point P. The vectors are defined in spherical coordinates in terms of their corresponding surface projections and angles relative to the normal direction vector of the point P being sampled.

Figure 2:
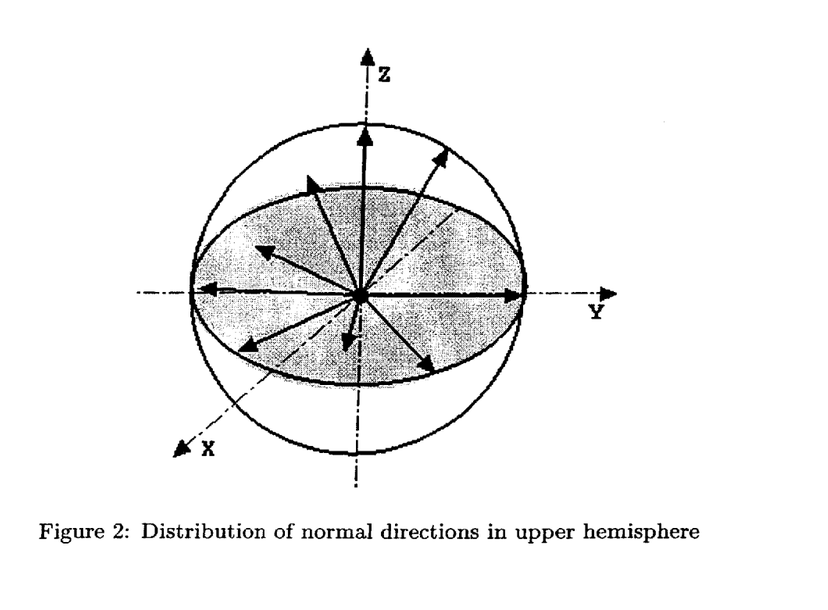
FIG. 2 illustrates distribution of normal direction vectors in a texture map.

In the invention, complex light scattering analysis for each point on the surface of an object is ignored. Instead, a global light reflectance texture map is generated for a distribution of normal direction vectors representing the range of orientations of points on the surface of the object being modeled. This can be envisioned as a distribution of normal direction vectors in the upper hemisphere of a hypothetical spherical model, as illustrated in FIG. 2. The distribution of vectors represents the surface characteristics and geometry of the surface being modeled with the BRDF model. As mentioned previously, the distribution of normal direction vectors for a given type of surface can be obtained on the basis of selected, conventionally available BDRF surface models. For example, a BRDF surface model for a flat, reflective surface made of brushed metal will have a certain characteristic (anisotropic) distribution of normal direction vectors (in terms of magnitude and direction). A BRDF model of a curved, high reflective smooth surface will have a quite different (isotropic) distribution of normal direction vectors.

Figure 3:
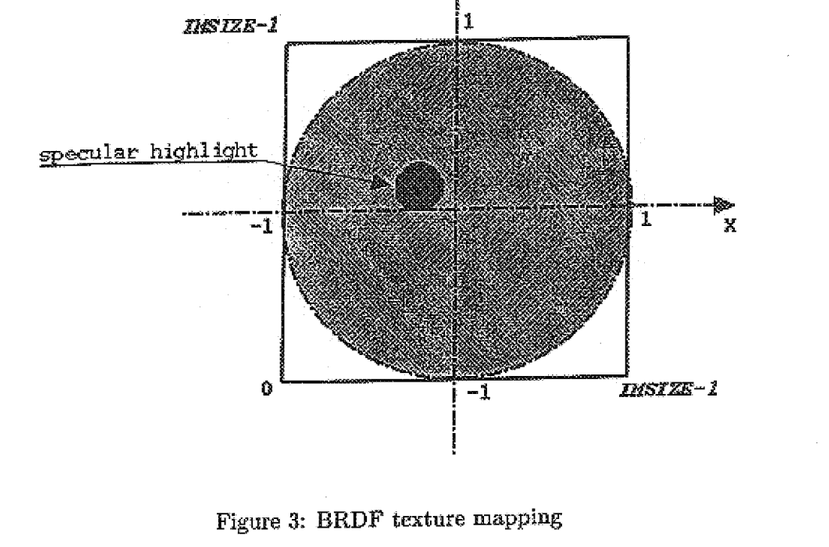
FIG. 3 illustrates BRDF texture map of an object of a given image size.
Figure 4:
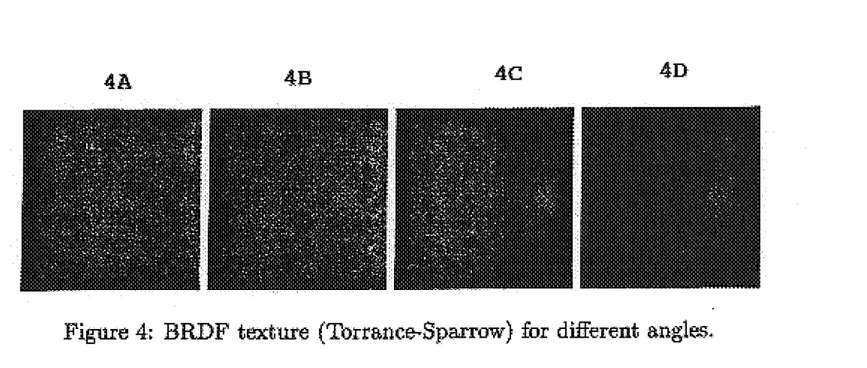
FIGS. 4A–4D illustrate a conventional BRDF texture for four different angles of viewing.

A BRDF texture map of the surface of the object is carried out by evaluation of diffuse and specular components. The computation of BRDF values is a 4D (four dimensional) function for each wavelength, so it is a mapping of a 5D function into a 3D space in the case of R, G, B lighting model. A 2D texture map in spherical coordinates is used to represent the 5D BDRF function. The 2D texture map can be thought of as BRDF values for a distribution of normal direction vectors in the upper hemisphere representing a range of surface points, as illustrated in FIG. 2. The distribution of normal direction vectors determined for a given surface characteristic and geometry are sampled in discrete angular increments over the given range sufficient for a desired level of visual resolution. The normal direction vectors are also normalized to a given unit image size, for example, in the interval [−1,1], as illustrated in FIG. 3.

The BRDF function parameters (magnitudes and angles) are derived in terms of the incoming light vector L, the view vector V, and the normal direction vectors N. The actual computation of BRDF values is then done by using the derived function parameters and a mathematical model for the light reflectance function. Conventional light reflectance functions, such as Torrance-Sparrow, Phong, Strauss, etc., may be used. In these approaches, the diffuse component of the BRDF values can be assumed to be lambertian and unaffected by surface geometry attenuation or microfacet distribution. A modified approach may also be used, referred to as Schlick, which takes into account the surface characteristics for both diffuse and specular components. This approach is found to give better visual results and is faster for computation than the conventional BRDF models. It combines the diffuse and specular components by multiplying one by the other, instead of summing them.

The computed values for the BRDF light reflectance texture map is stored as a lookup table indexed to the discretized increments of normal directions. A BRDF texture map is computed for each object surface, direction of light source, and direction of viewing in a scene, If the object's surface normals do not change from frame to frame, then the BRDF values remain unchanged. Thus, for a non-deforming object, there is no need to recompute the BRDF texture map for every frame. The BRDF texture maps are stored as part of the scene data for a CG program. During real-time rendering, the BRDF value for any point on the surface of an object in a scene is retrieved based upon the normal direction vector specified for that point in the scene, and used to derive the shading value for the associated light source in the scene. Examples of the shading results for 4 views of a spherical surface based on the Torrance-Sparrow model are illustrated in FIGS. 4A–4D, and 4 views based upon the Schlick model are illustrated in FIGS. 7A–7D.

Figure 5:
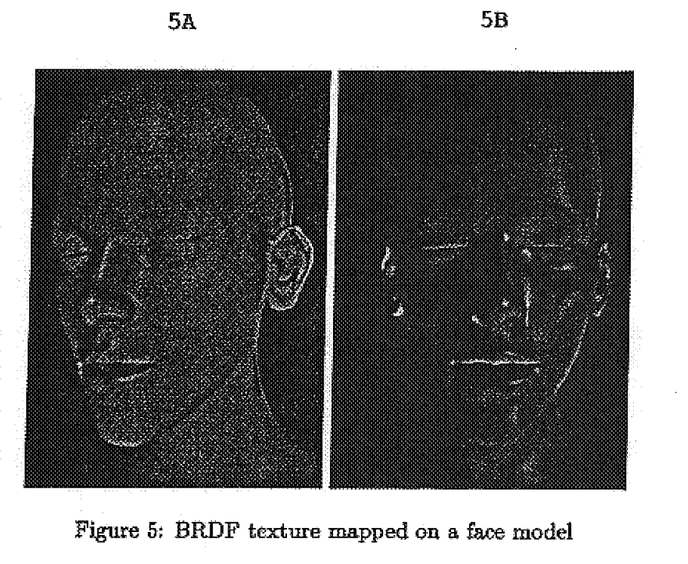
FIGS. 5A and 5B illustrate applying a conventional BRDF texture map on a face model.
Figure 6:
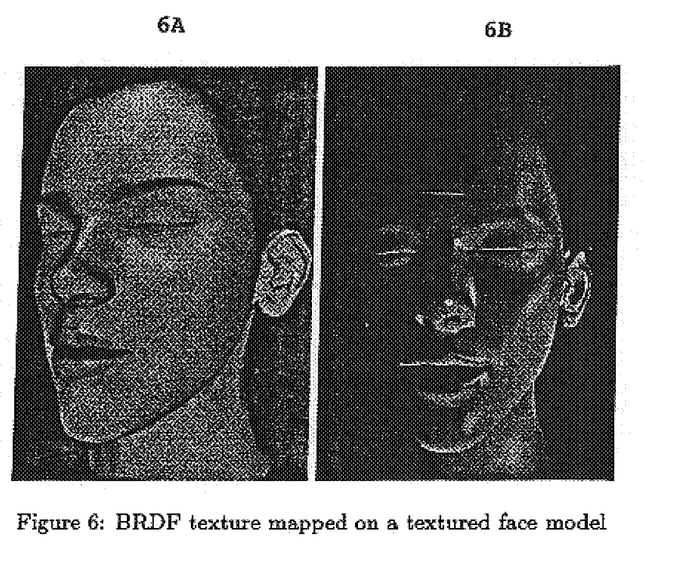
FIGS. 6A and 6B illustrate applying a conventional BRDF texture map on a textured face model.
Figure 7:
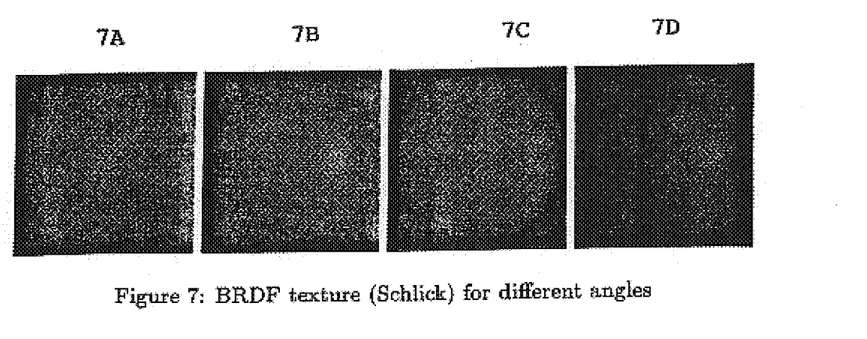
FIGS. 7A–7D illustrate a different (Schlick) BRDF texture map on an object for four different angles of viewing.

The surface of the object may be without other surface texture characteristics, such as a smooth surface, or may be a highly textured surface, such as a face textured with hair and features like eyebrows and lips. In a surface without texture, and using the conventional BRDF model, the specular component can be mapped on the surface in one pass. Examples of the shading results for an untextured face mapped with conventional BRDF are illustrated in FIGS. 5A and 5B. If the object is textured, its surface diffuses color, so both the diffuse and specular components of the BRDF texture map are used. In the conventional BRDF model, the diffuse component is considered lambertian, and can be incorporated in the hardware performance of the illumination process by using a diffusion coefficient. The diffuse component is combined with the texture of the object's surface on a first pass, and the specular component is added to the shading on a second pass. Examples of the shading results for a textured face mapped with conventional BRDF is illustrated in FIGS. 6A and 6B.

Figure 8:
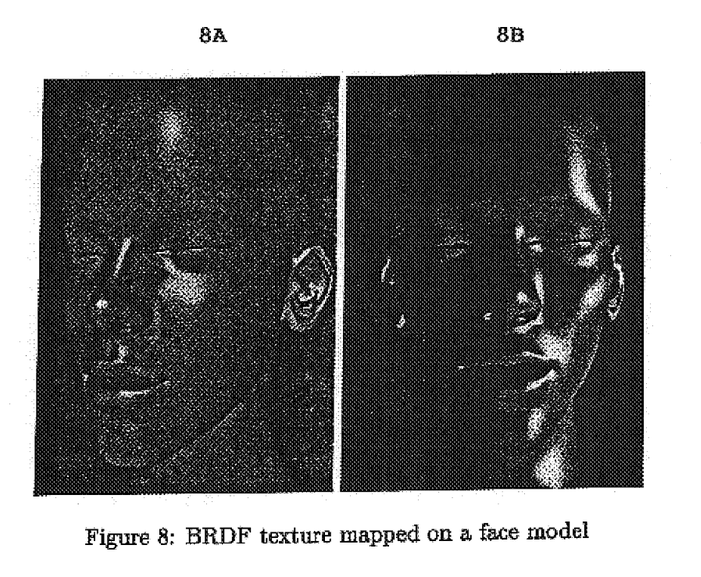
FIGS. 8A and 8B illustrate applying a different (Schlick) BRDF texture map on a face model.
Figure 9:
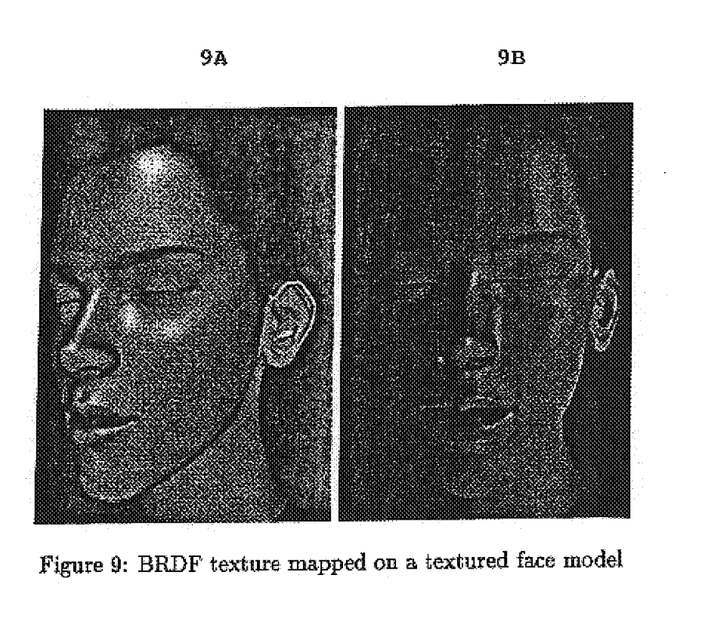
FIGS. 9A and 9B illustrate applying a different (Schlick) BRDF texture map on a textured face model.

In the modified Schlick BRDF model, two texture map values are used, one with the diffuse component dominant, and the other with the specular component dominant. If the surface is without texture, only one BRDF texture combining diffuse and specular components is used in one pass (Surface Type Single). Examples of the shading results for an untextured face mapped with Schlick BRDF are illustrated in FIGS. 8A and 8B. If the surface is textured, shading proceeds in three passes. In the first pass, the object is drawn with its surface texture but without illumination. In the second pass, the diffuse dominant BRDF texture is blended with the result of the first pass, and in the third pass, the specular dominant BRDF texture is blended (Surface Type Double). Examples of the shading results for a textured face mapped with Schlick BRDF are illustrated in FIGS. 9A and 9B.

Figure 10:
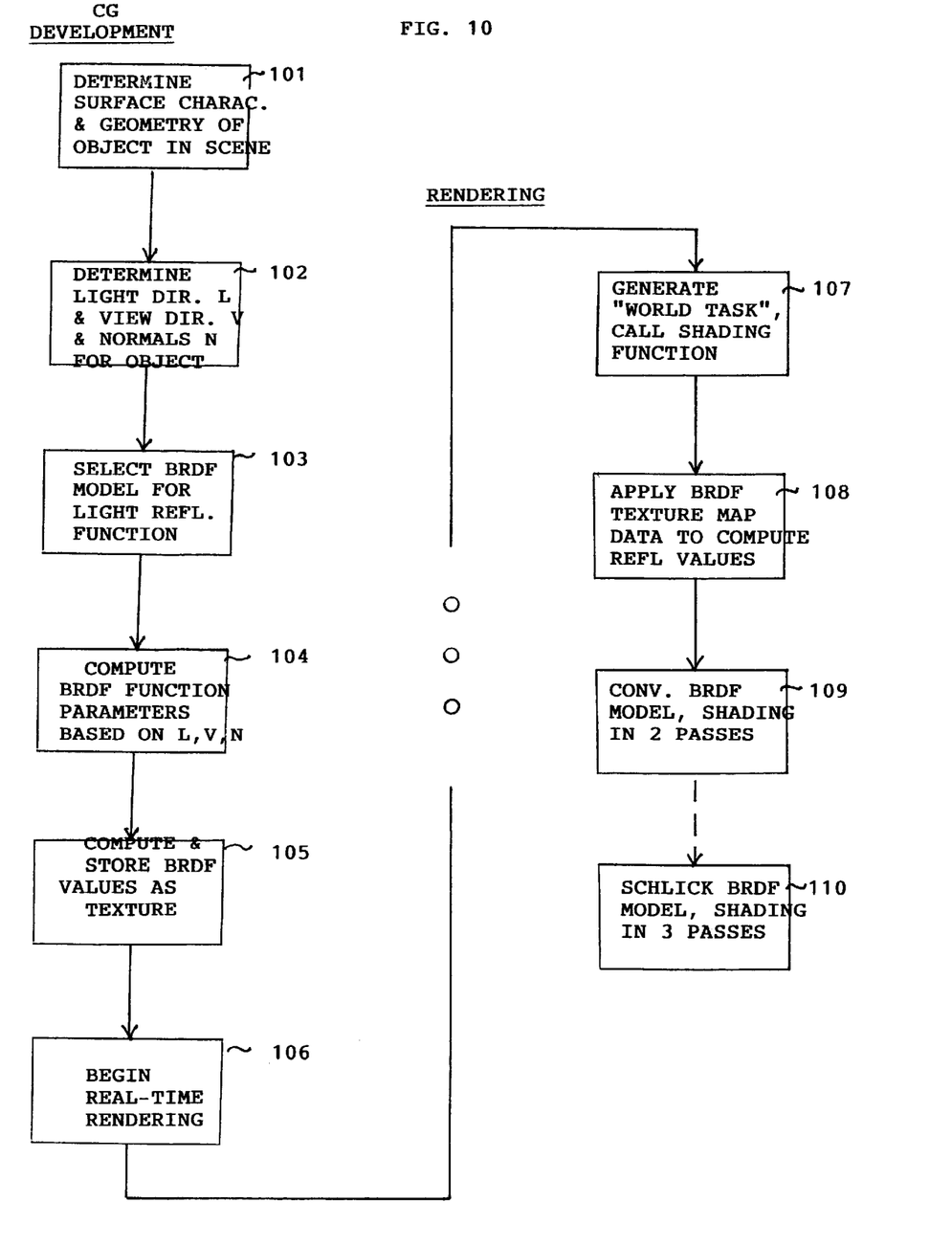
FIG. 10 is a logic diagram of applying BRDF texture map on a textured object.

Referring to FIG. 10, a logic diagram illustrates the overall process steps in the preferred implementation of the invention. During development of a CG program, the surface characteristics and geometry of an object in a scene are determined, as indicated at block 101. Based upon the surface characteristics and geometry, a distribution of normal direction vectors N for the object is determined, relative to the light direction L and view direction V in the scene, at block 102. The particular BRDF light reflectance model to be used is selected depending upon the type of surface, at block 103. The BRDF function parameters are computed based upon the parameters of the light direction L, view direction V, and normal direction vectors N for the object, at block 104. Using the computed function parameters and BRDF model, the BRDF values are computed and stored as a texture map for the object surface in the scene, at block 105, and retained as scene data awaiting the beginning of real-time rendering, as indicated at block 106, e.g., upon initialization of a CG video game or movie.

During real-time rendering, a "World Task" for a scene is generated, defining each frame of the scene and its objects and illumination sources, and for each frame the shading function is called, as indicated at block 107. For a typical shading task, the shading function computes the surface light and color reflected from the illumination sources at each point on an object's surface in the scene. First, the surface characteristic and color properties of the object stored with the scene data are retrieved. Then the light reflected at each point from light sources in the scene is computed. As indicated at block 108, the stored BRDF texture map is applied to compute the light reflectance values for the points on the object's surface. With the conventional BRDF model, shading proceeds in 2 passes, adding a diffuse component and a spectral component, as indicated at block 109. With the Schlick BRDF model, shading proceeds in 3 passes, first shading the surface texture features, and blending a diffuse-dominant component and then a spectral-dominant component, as indicated at block 110.

In summary, the invention provides an improved surface shading technique for real-time CG rendering in which a physical light reflectance texture map is computed and stored during the CG development phase, then later applied during the real-time rendering phase. This approach allows the rich texturing of a physical light reflectance model, such as conventional BRDF models or a modified Schlick BRDF model, to be used for shading in real-time rendering. The BRDF texture map can be applied to any arbitrary geometry as long as the vertices of the microfacets on the surface of the object are available. This approach is well suited for real-time rendering using conventional hardware and multipass shading techniques, and also allows BRDF texture map to be used in combination with textured surfaces such as skin.

It is understood that many other modifications and variations may be devised given the above description of the principles of the invention. It is intended that all such modifications and variations be considered as within the spirit and scope of this invention, as defined in the following claims.

1 Introduction

The reflectance model is a key feature in any rendering engine because it provide the illumination of object in the scene and therefore the pixel color in the image. There have been many reflectance models introduced in computer graphics. Some empirical and some physically based. BRDF is a physically-based model that has been used in many rendering engine because it simulates the physical principles involved in light interaction with surface material. Despite its success in rendering packages, BRDF hasn't been used that much in real time rendering applications because of the expensive cost to compute the function each frame. We present a technique that uses physically based reflectance model (BRDF) in a real-time rendering engine.

In section 3 the BRDF texture generation is explained. Section 4 details the parameters and geometric entities needed for BRDF evaluation. Algorithmic details and texture mapping are presented in sections 5 and 6. Finally section 7 illustrate application of the technique and implementation details.

2 Background

The interaction of light and surface material can be modeled as relating the incoming radiance ($E_i$) to the outgoing irradiance ($I_r$) at the surface point P. The relation function $\rho$ is the BRDF (Bidirectional Reflection Distribution Function).

In this paper any term that is function of the wavelength will be subscripted by $\lambda$.

$$\rho = \frac{I_r}{E_i} \tag{1}$$

$$E_i = I_i(\vec{N} \cdot \vec{L}) d\omega \tag{2}$$

$$I_{r\lambda} = \int_{Lev} \rho_\lambda(P, \vec{V}, \vec{L}) I_{i\lambda}(P, -\vec{L})(\vec{N} \cdot \vec{L}) d\omega \tag{3}$$

where $I_{r\lambda}(P, \vec{V})$ is the irradiance leaving point P in direction $\vec{V}$, $I_{i\lambda}(P, -\vec{L})$ is the radiance reaching point P from direction $-\vec{L}$, $\rho_\lambda(P, \vec{V}, \vec{L})$ is the BRDF value at the surface point P, $v$ is the possible direction of incident light, $d\omega$ is the differential solid angle surrounding direction $\vec{L}$, $\vec{N}$ is the surface normal (unit vector), $\vec{L}$ is the direction towards light (unit vector), $\vec{V}$ is the direction towards viewer (unit vector), P is the surface point being sampled 2.1 BRDF Parameters Definition BRDF computation at a given surface point requiers the definition of a few geometric entities. (refer to FIG. 1)

$\vec{V}$ is the outgoing direction, $\theta_r \equiv (\widehat{\vec{V}, \vec{N}})$, $\vec{L}$ is the ingoing direction, $\theta_i \equiv (\widehat{\vec{L}, \vec{N}})$, $\vec{N}$ is the surface normal, $\phi_r \equiv (\widehat{\vec{V}, \vec{T}})$, $\vec{T}$ is the surface tangent, $\phi_i \equiv (\widehat{\vec{L}, \vec{T}})$, $\vec{H}$ is the bisector vector, $\phi_h \equiv (\widehat{\vec{H}, \vec{T}})$, $\vec{H}$ is the projection of $\vec{H}, \beta \equiv (\widehat{\vec{V}, \vec{H}})$, $\vec{B}$ is the bi-normal vector, $\alpha \equiv (\widehat{\vec{H}, \vec{N}})$ Traditionally two kind of surfaces characteristics are distinguished in BRDF terminology: Diffuse and Specular. The BRDF computation is then carried out by evaluation of the Diffuse and Specular components. This distinction is made in most of BRDF research: $\rho = \rho_d + \rho_s$. An ambient component is added sometimes but it can be expressed as a fraction of the Diffuse component.

3 BRDF Texture

The BRDF is a 4D (four dimensional) function for each wavelength, so it is a 5D function into a 3D space in the case of R, G, B model. We want to use a 2D texture map to represent the BRDF (5D function) which is, at each surface point, have the BRDF available for R,G,B from $\theta_i, \theta_r, \phi_i, \phi_r$. We need two (2) parameters (U, V) to access the 2D BRDFtexture.

A BRDF texture is computed for the upper hemisphere (distribution of directions of normal). This process conciste in discretizing the normal directions of the upper hemisphere. The directions in the upper hemisphere are defined by: (refer to FIG. 2)

$$\vec{N} = \begin{cases} X \in [-1, 1] \\ Y \in [-1, 1] \\ Z \in [0, 1] \end{cases} \text{ with } X^2 + Y^2 + Z^2 = 1$$

For a given pair $(X, Y) \in \{-1, 1\} \times \{-1, 1\}$, we compute the corresponding direction vector and then the relevant parameters for BRDF evaluation: $\vec{N}$, $\vec{T}$, $\vec{B}$, $\theta_i$, $\theta_r$, $\phi_i$, $\phi_r$, $\phi_h$, $\vec{H}$, $\alpha$, $\beta$

4 BRDF Parameters Computation

4.1 Normal Vector (Direction) Computation

To define the normal vector $\vec{N}(X, Y, Z)$, X and Y are sampled in the interval $[-1,1]$ and Z is deduced by the fact that the vector is normalized.

$$\vec{N} = \begin{cases} X \in [-1, 1] \\ Y \in [-1, 1] \\ Z = \sqrt{1 - Y^2 - Z^2} \text{ since } X^2 + Y^2 + Z^2 = 1 \end{cases}$$

If X and Y are outside the unit circle, they are snap back to the circle by normalization. i.e:
$l_n = X^2 + Y^2$
if $(l_n > (1-\epsilon))$ then $l_n = \sqrt{l_n} + \epsilon$
$X = X/l_n$
$Y = Y/l_n$
Z is then computed from the new X and Y values.

$$\vec{N} = (X, Y, \sqrt{1-X^2-Y^2}) \quad (4)$$

4.2 Tangent and Bi-normal Vectors Computation

To compute the tangent and bi-normal vectors we need an orthogonal vector to $\vec{N}$. The choice of that orthogonal vector will dictate the direction of $\vec{T}$ and $\vec{B}$ the tangent and bi-normal vectors. Given $\vec{N}(X,Y,Z)$ the vector $\vec{N}_{xz}'(-Z,0,X)$ is orthogonal to $\vec{N}$.

$$\vec{N}_{xz} = \begin{cases} \frac{-Z}{\sqrt{X^2+Z^2}} \\ 0 \\ \frac{X}{\sqrt{X^2+Z^2}} \end{cases} \text{ is orthogonal to } \vec{N}$$

$\vec{T}$ is orthogonal to $\vec{N}$. It can be obtained by the cross product of $\vec{N}$ and $\vec{N}_{xz}$.

$$\vec{N} \wedge \vec{N}_{xz} = \vec{T} \begin{pmatrix} \frac{-XY}{\sqrt{X^2+Z^2}} \\ \sqrt{X^2+Z^2} \\ \frac{-ZY}{\sqrt{X^2+Z^2}} \end{pmatrix} \quad (5)$$

$(\vec{T}, \vec{B}, \vec{N})$ is a 3D space orthonormal basis. Then $\vec{B}$ is computed by cross product of $\vec{N}$ and $\vec{T}$.

$$\vec{N} \wedge \vec{T} = \vec{B} \quad (6)$$

4.3 BRDF Angles and Vectors

For $\vec{L}$, $\vec{V}$ incident light and view vectors we can now compute $\theta_i$, $\theta_r$, $\phi_i$, $\phi_r$, $\vec{H}$ since we have $\vec{T}$, $\vec{B}$, $\vec{N}$. We also compute $\phi_h$, $\alpha$, $\beta$. The BRDF parameters will be defined in $(\vec{T}, \vec{B}, \vec{N})$ basis.

$$\vec{H} = \frac{\vec{L}+\vec{V}}{\|\vec{L}+\vec{V}\|}$$

$$\theta_i = \cos^{-1}(\vec{L}\cdot\vec{N}), \quad \theta_r = \cos^{-1}(\vec{V}\cdot\vec{N})$$

$$\phi_i = \tan^{-1}\left(\frac{\vec{L}\cdot\vec{B}}{\vec{L}\cdot\vec{T}}\right), \quad \phi_r = \tan^{-1}\left(\frac{\vec{V}\cdot\vec{B}}{\vec{V}\cdot\vec{T}}\right)$$

$$\alpha = \cos^{-1}(\vec{H}\cdot\vec{N}), \quad \phi_h = \tan^{-1}\left(\frac{\vec{H}\cdot\vec{B}}{\vec{H}\cdot\vec{T}}\right)$$

$$\beta = \cos^{-1}(\vec{V}\cdot\vec{H}) = \cos^{-1}(\vec{L}\cdot\vec{H})$$

In basis $(\vec{T}, \vec{B}, \vec{N})$ $$U = \frac{X+1}{2}$$

$$V = \frac{Y+1}{2}$$

We now have all the parameters needed to compute the BRDF texture.

5 BRDF Texture Computation and Mapping

The parameters defined in the previous section allow the computation of a BRDF texture representing a distribution of normal directions (upper hemisphere).

5.1 Algorithm

The size of the texture image is the sampling resolution of the distribution of normal directions. The bigger the texture size, the more accurate is the sampling. For a given texture image size of IMSIZE, I and J are the pixel coordinates (raw J and column I). To insure that $(X,Y) \in \{-1,1\} \times \{-1,1\}$ X and Y are computed as follow:
(refer to FIG. 3)

$$\vec{L}_{TBN}\begin{pmatrix}\sin\theta_i\cos\phi_i\\ \sin\theta_i\sin\phi_i\\ \cos\phi_i\end{pmatrix}, \vec{V}_{TBN}\begin{pmatrix}\sin\theta_r\cos\phi_r\\ \sin\theta_r\sin\phi_r\\ \cos\phi_r\end{pmatrix}$$

$$\vec{H}_{TBN}\begin{pmatrix}\sin\alpha\cos\phi_h\\ \sin\alpha\cos\phi_h\\ \cos\alpha\end{pmatrix} = \left(\frac{\vec{L}_{TBN}+\vec{V}_{TBN}}{\|\vec{L}_{TBN}+\vec{V}_{TBN}\|}\right)$$

The outlines for the BRDF computation algorithm are:
For $(X,Y) \in \{-1,1\} \times \{-1,1\}$
If $((l_n = X^2+Y^2) > (1-\epsilon))$ then $$X = \frac{2*I}{IMSIZE-1} - 1$$

$$Y = \frac{2*J}{IMSIZE-1} - 1$$

Compute Z from $Z = \sqrt{1-X^2-Y^2}$
$\vec{N} = \{X,Y,Z\}$
Compute $\vec{T}$ and $\vec{B}$ from Equations (5) and (6)
Compute $\theta_i$, $\theta_r$, $\phi_i$, $\phi_r$, $\alpha$, $\beta$, $\phi_h$ from formulas in previous section.

Compute the BRDF value for this (X,Y) pair

To perform the texture map onto a geometry, new texture coordinates have to be evaluated for each vertex based on the computation formula for the BRDF texture.

The new texture coordinates are function of the vertex normal (normalized). We use the X and Y coordinates of the vertex normal N(X,Y,Z).

$$l_n = \sqrt{l_n} + \varepsilon; X = \frac{X}{l_n}; Y = \frac{Y}{l_n}$$

For every new position and/or direction of the light source and/or the view camera, the BRDF texture has to be recomputed. the texture coordinates for BRDF remain unchanged as long as the object's normals are unchanged. For a non-deforming object, there is no need to recompute the BRDF texture coordinates every frame.

6 Computation of the BRDF Value

The actual computation of the BRDF texture values (pixel color) can be done using any of the existing methods (Torrance-Sparrow, Phong, Strauss . . . ).

We implemented some of the above methods. In all those approaches, the diffuse part of the BRDF was assumed lambertian and wasn't affected by neither the surface geometric attenuation nor the microfacet distribution.

$$\rho_\lambda(\theta_i, \theta_r, \alpha, \beta, \phi_h) = \quad (7)$$

$$\frac{k_d}{\pi}C_\lambda + \frac{k_s}{4\pi\cos\theta_i\cos\theta_r}F_\lambda(\beta)G(\theta_i, \theta_r)D(\alpha, \phi_h) \text{ with } k_d + k_s = 1$$

In [7], Schlick present a different new approach to BRDF computation with optimized functions when necessary, which take into acount the surface characteristics for both diffuse and specular components. As expected, the implementation of this new approach with minor extentions to make it usable for texture map, gave better visual results and is faster than the traditional BRDF computation. The new approach evaluates the BRDF computing the Spectral and Directional components. They are combined by multiplying one by the other instead of summation (Diffuse and Specular). Two types of surfaces are introduced: Single (one spectral component and one directional component) and Diffuse (two spectral components and two directional components).

The following formulas are extracted from [7]:

BRDF Components $$Spectral: S_\lambda(u) = C_\lambda + (1 + C_\lambda)(1 - u)^5 \quad (8)$$

$$Directional: D(t, v, l, w) = \frac{a}{\pi} + bB(t, v, l, w) + \frac{c}{ldw}\Delta \text{ with } a + b + c = 1$$

Surface Types

Single: $\rho_\lambda(t,u,v,l,w) = S_\lambda(u)D(t,v,l,w)$

Double: $\rho_\lambda(t,u,v,l,w) = S_\lambda(u)D(t,v,l,w) + (1-S_\lambda(u))S_\lambda'(u)D'(t,v,l,w)$ (9)

with t=cos α, u=cos β v=cos $\theta_r$, l=cos $\theta_i$ w=cos $\phi_h$

In our implementation we used the BRDF parameters r, p introduced in [7] and an additional fresnel parameter to specify if we use the Fresnel term $$G = \min\left(1, \frac{2tv}{u}, \frac{2tl}{u}\right)$$

$$Z = \frac{r}{(1 + (r-1)t^2))^2}$$

$$A = \sqrt{\frac{p}{p^2(1-w^2)+w^2}}$$

$$B = \frac{AZG}{4\pi vl}$$

$$\Delta = (t > \cos(dw)) ? \frac{1}{ldw} : 0$$

or not.

b=4r(1−r)

a=(r<0.5)?0:1−b c=(r<0.5)?((fresnel?1−b: 0): 0

In addition to the new parameter fresnel, we used the Beckmann distribution function $$\frac{c}{ld\omega}\Delta$$

7 Application and Implementation

We applyed the BRDF texture map technique to a synthetic skin shader in DANCER rendering engine. A skin texture image painted by an artist is provided. The BRDF texture is combined with the skin texture for object surface shading in two or three passes depending on the approach.

7.1 Diffuse Plus Specular (Conventional BRDF)

A shading using BRDF can be sommarize by the equation $$I_{r\lambda} = \rho_d I_{a\lambda} + I_{i\lambda}(\vec{N}\cdot\vec{L})d\omega(k_d\rho_d + k_s\rho_{s\lambda}) \quad (10)$$

If a texture image is used as object diffuse color. The shading equation with texture becomes $$I_{r\lambda} = k_a\rho_a O_{d\lambda} + I_{i\lambda}(\vec{N}\cdot\vec{L})d\omega(k_d\rho_d O_{d\lambda} + k_s\rho_{s\lambda}O_{s\lambda})$$

$$\rho_a = \pi\rho_d \quad (11)$$

The diffuse component of the BRDF is considered lambertian. It can be incorporated in the hardware illumination process by providing a diffuse coefficient $$I_i(\vec{N}\cdot\vec{L})d\omega\frac{k_d}{\pi}O_d$$

Then the diffusigue illumination $$k_d' = \frac{k_d}{\pi}d\omega.$$

will be combined with the texture in the first rendering pass. We only need to compute a specular BRDF texture.

The second pass blends the specular BRDF texture with the result of the first pass by adding a specular component to the shading. (refer to FIGS. 6A, 6B)

7.2 Spectral and Directional (Schlick BRDF)

In order to accurately apply the BRDF texture with the new approach, two texture are necessary. One with diffuse dominant and one with specular dominant. The shading processes in three passes if BRDF texture is combined with textured skin (surface) and in one pass if the surface is of type Single.

The three passes process as follow:

In the first pass the object is drawn with just the surface texture image without illumination. The illumination is computed and kept in the BRDF texture.

The second pass blends the diffuse dominant BRDF texture with the first pass' result by multiplying texture.

The third pass blends the specular dominant BRDF texture with the second pass' result by addition.

The surface is considered of type Double. (refer to FIGS. 9A, 9B)

When shading a surface without texture only one BRDF texture combining diffuse and specular (and possibly ambient) is used. (refer to FIGS. 8A, 8B)

8 Conclusion

A technique for using texture map to discretize and store BRDF values is presented. The BRDF texture generated can be applyed onto arbitrary geometry as long as the vertices normals are available. The size of the BRDF texture texture defines the computation time spent to evaluate the BRDF. Our approach is well suited for mixing BRDF information and surface texture image using texturing features available in hardware.

REFERENCES

[1] Michael Ashikhmin, Simon Premože, and Peter Shirley. A microfacet-based brdf generator. In Kurt Akeley, editor, *SIGGRAPH* 2000 *Conference Proceedings*, Annual Conference Series, pages ???-??? ACM SIGGRAPH, Addison Wesley, August 2000. held in New Orleans, La., Jul. 23–27, 2000.

[2] Marschner S. Westin S. Lafortune E. Torrance K. and Greenberg D. Reflectance measurements of human skin. In *Technical repport*, pages ???-??? ???, 1999.

[3] He X. Torrance K. Sillon P. and Greenberg D. A comprehensive physical model for light reflection. In *SIGGRAPH* 1991 *Conference Proceedings*, Annual Conference Series, pages ???-??? ACM SIGGRAPH, Addison Wesley, 1991.

[4] Watt A. Watt M. Advanced Animation and Rendering Techniques: Theorie and Practice. Addison Wesley, 1992.

[5] Szymon Rusinkiewicz. A new change of variable for efficient brdf representation. In *Technical repport*, pages ???-??? Stanford University, 1997.

[6] Szymon Rusinkiewicz. A survey of brdf representation for computer graphics. In *Technical repport*, pages ???-??? Stanford University, 1997.

[7] Christophe Schlick. An inexpensive brdf model for physically-based rendering. In *Technical repport*, pages ???-??? LaBRI, 1998.

[8] Foley J. van Dam A. Feiner S. and Hughes J. *Computer Graphics: Principles and Practice.* Addison Wesley, 1996.

I claim:

1. An improved surface shading method comprising:
   (a) determining surface characteristics and geometry parameters of a surface of an object in a scene during development of a computer graphics (CG) program;
   (b) determining for a frame of the scene an incoming light direction illuminating the surface of the object and an outgoing light direction of viewing the object in the scene;
   (c) applying a selected bidirectional reflectance distribution (BRDF) model to compute light reflectance values for a sampling of a distribution of normal direction vectors for light reflectance from the surface of the object in the frame of the scene based upon the incoming and outgoing light directions and the surface characteristics and geometry parameters of the surface of the object;
   (d) storing the sampled BRDF values as a texture map of light reflectance for surface shading of the object in the frame of the scene; and
   (e) performing surface shading of the object during real-time rendering by applying the sampled BRDF values in correspondence to normal direction vectors for points on the surface of the object in the frame of the scene, wherein the BRDF model is selected from the group consisting of: Torrance-Sparrow model; Phong model, Strauss model; and modified Schlick model.

2. An improved surface shading method comprising:
   (a) determining surface characteristics and geometry parameters of a surface of an object in a scene during development of a computer graphics (CG) program;
   (b) determining for a frame of the scene an incoming light direction illuminating the surface of the object and an outgoing light direction of viewing the object in the scene;
   (c) applying a selected bidirectional reflectance distribution (BRDF) model to compute light reflectance values for a sampling of a distribution of normal direction vectors for light reflectance from the surface of the object in the frame of the scene based upon the incoming and outgoing light directions and the surface characteristics and geometry parameters of the surface of the object;
   (d) storing the sampled BRDF values as a texture map of light reflectance for surface shading of the object in the frame of the scene; and
   (e) performing surface shading of the object during real-time rendering by applying the sampled BRDF values in correspondence to normal direction vectors for points on the surface of the object in the frame of the scene, wherein the BRDF values are stored as a look up table indexed to the sampling of normal direction vectors.

3. An improved surface shading method according to claim 2, wherein the distribution of normal direction vectors is based upon a standard model for physical light reflectance from a given type of surface.

4. An improved surface shading method according to claim 2, wherein the sampling of the distribution of normal direction vectors is taken in discrete increments of normal direction vectors for an upper hemispherical space normalized to a unit image size.

5. An improved surface shading method comprising:
   (a) determining surface characteristics and geometry parameters of a surface of an object in a scene during development of a computer graphics (CG) program;
   (b) determining for a frame of the scene an incoming light direction illuminating the surface of the object and an outgoing light direction of viewing the object in the scene;
   (c) applying a selected bidirectional reflectance distribution (BRDF) model to compute light reflectance values for a sampling of a distribution of normal direction vectors for light reflectance from the surface of the object in the frame of the scene based upon the incoming and outgoing light directions and the surface characteristics and geometry parameters of the surface of the object;

(d) storing the sampled BRDF values as a texture map of light reflectance for surface shading of the object in the frame of the scene; and (e) performing surface shading of the object during real-time rendering by applying the sampled BRDF values in correspondence to normal direction vectors for points on the surface of the object in the frame of the scene, wherein the surface of the object is without other surface texture characteristics, and the surface shading for physical light reflectance is performed in one pass.

6. An improved surface shading method comprising:

(a) determining surface characteristics and geometry parameters of a surface of an object in a scene during development of a computer graphics (CG) program;

(b) determining for a frame of the scene an incoming light direction illuminating the surface of the object and an outgoing light direction of viewing the object in the scene;

(c) applying a selected bidirectional reflectance distribution (BRDF) model to compute light reflectance values for a sampling of a distribution of normal direction vectors for light reflectance from the surface of the object in the frame of the scene based upon the incoming and outgoing light directions and the surface characteristics and geometry parameters of the surface of the object;

(d) storing the sampled BRDF values as a texture map of light reflectance for surface shading of the object in the frame of the scene; and (e) performing surface shading of the object during real-time rendering by applying the sampled BRDF values in correspondence to normal direction vectors for points on the surface of the object in the frame of the scene, wherein the surface of the object is textured with other surface texture characteristics, and the surface shading for physical light reflectance is combined with shading for other surface texture characteristics in two or more other passes.

* * * * *